May 30, 1961  E. NICKEL ET AL  2,986,139
HEATER FOR GASEOUS WORKING MEDIUMS OF THERMAL POWER PLANTS
Filed June 10, 1954  2 Sheets-Sheet 1

EBERHARD NICKEL
THEODOR GEISSLER
INVENTORS

ATTORNEY

EBERHARD NICKEL
THEODOR GEISSLER
INVENTORs

ATTORNEY 2,986,139
Patented May 30, 1961

2,986,139

HEATER FOR GASEOUS WORKING MEDIUMS OF THERMAL POWER PLANTS

Eberhard Nickel, Stuttgart-Wangen, and Theodor Geissler, Stuttgart, Germany, assignors to Kohlenscheidungs-Gesellschaft m.b.H., a corporation of Germany Filed June 10, 1954, Ser. No. 435,840

1 Claim. (Cl. 126—109)

The invention relates to heaters for gaseous working mediums of thermo power plants, as they are utilized in the operation of air turbine plants. In such plants the working medium is conveyed through one or several pressure stages in circulation through the heater, the turbine, and the compressor and back to the heater. It is desirable to design such heaters for lowest possible pressure loss in the heater itself, for lowest possible production cost—which includes the use of the most economical structural materials—and for highest possible safety of operation. Considerable difficulties are however encountered in fulfilling all of these requirements when the heaters are to be fired with solid fuels, especially pulverized coal, because satisfactory combustion of the coal requires the use of very high combustion temperatures.

It has been proposed heretofore to heat the working air in a manner similar to that employed in radiant boilers. There the tubes line the walls of a furnace and thus by being exposed to the hot flames absorb heat by radiation. When firing oil or gas in connection with high excess air and recirculation of flue gases, such proposed heating of air is feasible. With pulverized coal furnaces, however, such heating proved impractical; when used with pulverized coal firing excess air and/or gas recirculation greatly hinders complete combustion of the coal. Without high excess air or gas recirculation however either the tube materials could not withstand the furnace temperature, although the working medium would be supplied to the heater at a relatively low temperature of about 662° F., or the pressure loss in the heater would be uneconomically high. It is known that the life of the radiant tubes bears a direct functional relationship to the pressure drop. This is due to the fact that heat conductivity from tube wall to air is very poor. Therefore very high velocities which lower the pressure of the operating medium must be employed in the tubes for efficient cooling of the tube walls by the working medium. Moreover, the strength of the tubes is greatly impaired by thermal stresses occurring within the structural material of the tubes.

A substantial improvement of these conditions is achieved according to the invention by arranging the heater tubes within the furnace in relatively wide spaced relation to each other and to the refractory wall of the furnace. The tubes are arranged in single strands through the furnace in a well known manner. However, the working medium being supplied to the furnace tubes is divided into several main streams and the various main streams are heated in separate tube groups passing through the furnace before again being reunited.

Since the furnace radiation can thus reach the refractory walls by passing between the heater tubes and is then reflected by it to the back of the tubes, extensive uniform heating of each heating tube all round is insured, so that abnormal thermal stresses in the tube material can hardly occur. Because of this, a higher temperature of the tube material can be permitted during operation. Assuming the use of identical material for the heater tubes it follows that a higher temperature in the furnace and/or the working medium is permissible in an apparatus as herein disclosed. Or assuming identical temperatures in the firebox and/or the operating medium, a material of lower thermostability and hence of course a cheaper material can be used in a heater designed according to our invention. Furthermore, our heater can be constructed of tubes which have a relatively short heat exposed portion resulting in lower pressure loss. Or, assuming identical pressure loss, the heater here disclosed can be utilized for more intensive cooling of the tube material through the use of higher velocities for the operating medium in the tubes or through the use of tubes of smaller diameter. For the same operating pressure such smaller tubes require reduced wall thicknesses, which result in reduced cost of tube material.

Since overheating and consequent rupture of merely one of the air heater tubes leads to the shutdown of the entire heater, the maintenance of a uniform tube wall temperature is of great importance. This will often go hand in hand with uniform heating of the working medium in the various heating tubes. Such uniform heating is brought about, according to the invention, by selectively altering the number and/or flow area of the non-heated portion of the tubes or tube groups in contrast with that of the heated tubes. By a proper selection of these connecting tubes it is possible also, even when maintaining constant velocities in the heated portions of the various heating tube groups, to equalize different flow resistances in the several heating tube groups for the purpose of obtaining equal total resistances in the various main streams between the points of division and reunification.

Those portions of the heating tubes or tube groups arranged outside the furnace are provided, according to the invention, with a larger total cross-sectional area than the total cross-sectional area of the heat exposed tubes associated therewith. Unnecessary pressure losses in the working medium are thereby eliminated.

It is accordingly the main object of the invention to provide an improved air heating furnace of superior construction and performance resulting from greater uniformity in heat absorption and high heat transfer efficiency.

Another important object of the invention is to subdivide each main heating circuit into at least two portions and introduce these portions into the furnace chamber at an elevation which coincides with that of the highest temperature zone, one portion extending in one direction through the furnace towards a lower temperature zone, and the other portion extending in the opposite direction likewise towards a lower temperature zone.

It is a further object of the invention to achieve uniform heat absorption in the tubes that are arranged adjacent the furnace walls by increasing the distance between these tubes where flame radiation is less intense or respectively decrease the distance between the tubes where flame radiation is more intense.

With these and other objects in view which will become apparent from the following description, reference is made to the accompanying drawing forming a part of this specification and illustrating our invention without intention of limiting the invention to any particular form or use.

Figure 1:
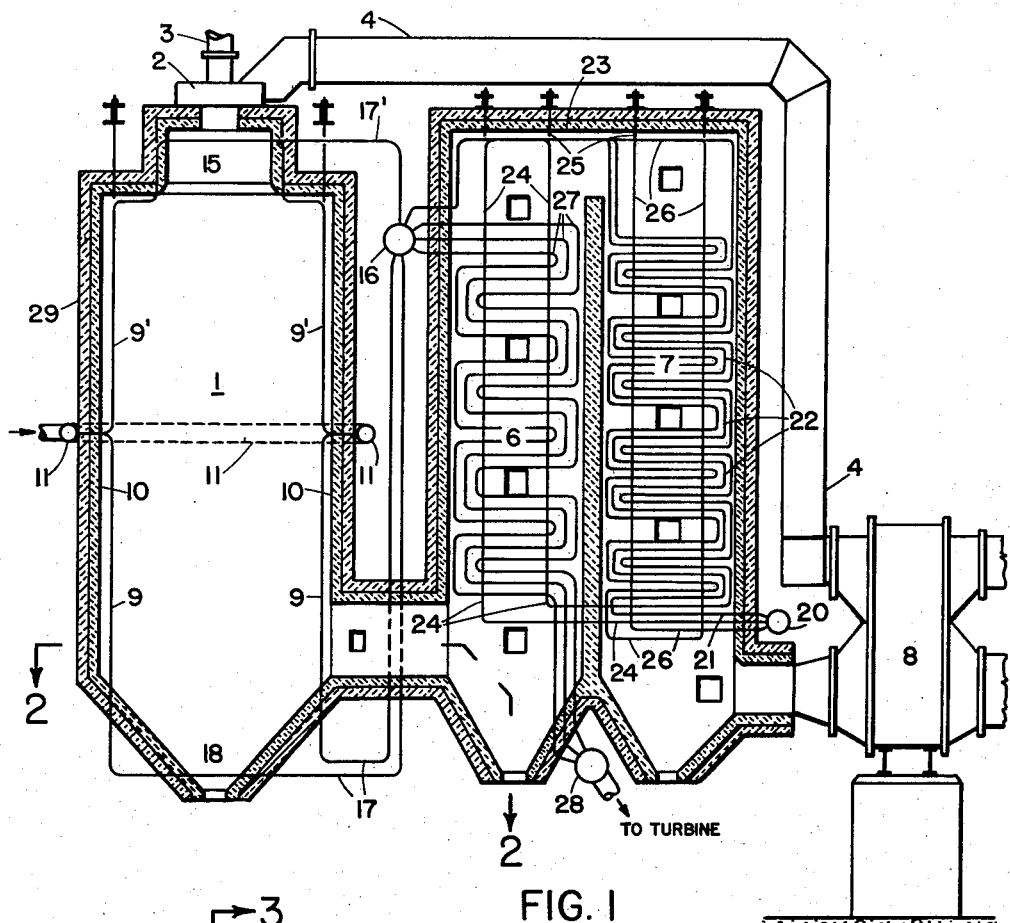
Fig. 1 shows a vertical section through a compressed air heater.
Figure 3:
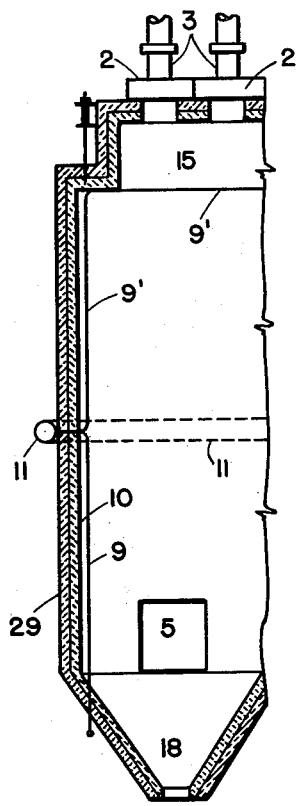
Fig. 3 shows a vertical partial section taken on line 3—3 of Fig. 2.
Figure 4:
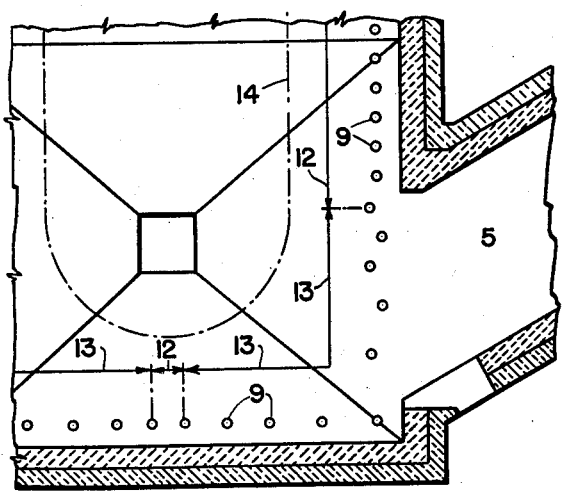
Fig. 4 is a partial section similar to Fig. 2 but on a larger scale.

The combustion chamber 1 of the heater receives pulverized fuel and combustion air by way of burners 2 disposed in the roof. The pulverized fuel with primary air is supplied to the burners through pipe 3 from a source not shown. Burners 2 are designed as turbulent burners and are preferably provided with regulating devices for variation of the flame turbulence and/or flame length. Additional combustion air or secondary air is supplied through air duct 4. The pulverized fuel burns in a flame path extending downwardly. The combustion gases, formed during combustion and subsequently cooled in the furnace chamber 1 to about 1800° F. for example, flow through the furnace offtakes 5 from the furnace chamber 1 into the up draft gas pass 6 and finally through the descending third gas pass 7. The gases then pass through an air heater 8 at an approximate temperature of 350° F., for example, to an induced draft fan and stack not shown. Air for combustion, heated, for example, to 750° F. in the air heater 8 is conveyed through conduit 4 to the burners 2. The tubes 9 and 9' of the heater for the compressed air are of uniform diameter and are arranged in spaced relation to walls 10 of the combustion chamber 1. Walls 10 are composed of refractory materials. As shown in Figs. 1 and 3 tubes 9 and 9' originate in a distributing header 11 surrounding the combustion chamber, or in several such headers distributed around the walls. The working air is conveyed to header 11 by well known means not shown and at a temperature of 710° F., for example. The tubes 9 and 9' are exposed to heat by direct radiation from the flames. The air accordingly is heated indirectly by non-contacting heat transfer, i.e., the air does not contact the heating gases directly. Since these tubes are spaced from each other, a portion of the furnace radiation passes between them to the combustion chamber walls and is reflected to the back of the tubes. In order to cause the heat absorption of the back side of the tubes to approach as much as possible the absorption of the front side of the tubes, a proper distance must be provided between the tubes. In addition, in order to achieve uniform absorption of heat in all radiant tubes, the distances between the tubes must be made greater where flame radiation is less intense, or respectively, the distances between the tubes must be reduced where the tubes are exposed to a more intensive flame radiation. It is generally understood that the intensity of radiation decreases inversely with the square of the distance of the source of radiation from the surface that is receiving radiation. As shown in Fig. 4 the spacing of the tubes 9 or 9' being of uniform flow capacity must, accordingly, be closest in the central area 12 of the wall and widest in the corner area 13 of the wall. Such spacing is desirable since the corner wall surfaces of the combustion chamber are faced by a relatively smaller radiating surface of the flame envelope, which is indicated by line 14, than are the center portions of wall 10.

Figure 2:
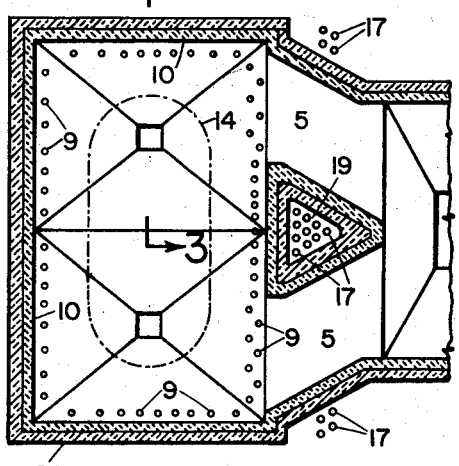
Fig. 2 is a horizontal partial section taken on line 2—2 of Fig. 1.

The tubes 9' are disposed in the upper portion of the combustion chamber and continue upwardly to cool and in part support the roof of the ignition chamber 15. They are then connected to the collector 16 by way of extensions 17' disposed outside the furnace chamber. The tubes 9 line the lower portion of the combustion chamber. Those tubes in front of outlet 5 are spread apart to form staggered rows of tubes, whereby to permit passage of the combustion gases and to prevent accummulation of slag between the tubes. The tubes then pass through the wall of the ash hopper 18. Some of the tubes 9 pass by way of extensions 17 through the shaft 19 (see Fig. 2) and others along the outside of the offtake 5 to ultimately terminate in collector 16. Tubes 17 and 17' located outside the combustion chamber 1 may be fabricated of less expensive material which must only withstand the pressure of the operating air and the temperature thereof. These tube portions 17 and 17' are provided with a relatively large flow area, to reduce pressure losses in the circuit as much as possible. On the other hand, the tubes 9 or 9' inside the combustion chamber will require a material of higher grade, since they are exposed on the outside to temperatures of 2200 to 2550° F. and more. The working air flows upwardly in the tubes 9' and downwardly in the tubes 9. In thus passing through the furnace it is divided into two main streams. There is available in tubes 9 and 9' twice as much flow area as is available in air heaters of known construction in which the tubes pass through the combustion chamber in one section extending from the roof to the bottom of the furnace. Consequently the pressure loss in the tubes can be substantially reduced in an organization designed according to our invention as herein disclosed. Or, for the same pressure loss, thin walled tubes of smaller diameter may be used requiring less material and possessing greater elasticity. In determining the exact location of distributing header 11 careful consideration is given—in accordance with the invention—to obtaining equal heating in the tube legs 9 and 9'. Equal heating also makes it possible at the same time to achieve substantially equal pressure loss in these tubes at economic velocities, through proper selection of the flow area of the unheated tube sections 17 or 17'.

Figure 6:
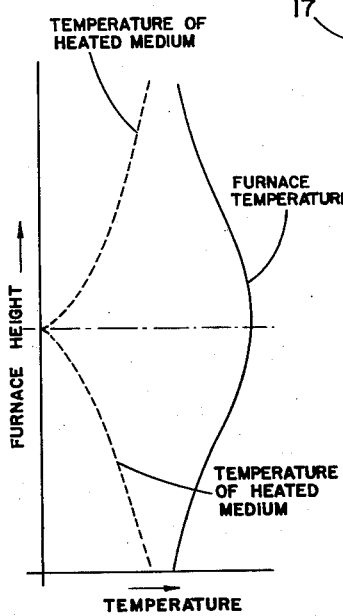
Fig. 6 is a plot showing the temperatures in the furnace and of the working medium in relation to the flame travel in the furnace chamber.

It is well known in the operation of furnaces of the type herein described, wherein the fuel is introduced at the top and the gases of combustion leave near the bottom of the furnace chamber, that the highest furnace temperatures are experienced somewhere in the middle portion of the chamber. This is schematically illustrated in Fig. 6 which shows a plot of the furnace temperature plotted against the height of the furnace.

It will be noted that the distributing header 11 is placed adjacent the zone of highest furnace temperature. Working air at its lowest temperature therefor is exposed to the highest furnace temperature, said air passing upwardly through tubes 9' towards a zone of lower furnace temperature and also downwardly through tubes 9 again towards a zone of lower furnace temperature.

In this manner it is possible to obtain a lower tube metal temperature than if the air were introduced either near the roof or near the bottom of the furnace chamber. This lower metal temperature makes it possible to use a shorter length of expensive alloy steel tubing than in the conventional design.

A portion of the compressed working air being heated is supplied to the heater through the distributor header 20 (see Fig. 1). From this header tubes 21 extend into gas pass 7 to participate in forming heating coils 22. Tubes 21 extend upwardly to the roof 23, along the roof and terminate in header 16. A second set of tubes 24 extend into the upflow gas pass 6 to the roof 23 reverse their direction and pass down again before they join tubes 21 in winding back and forth in the gas pass 7 to form coils 22. Rising upwardly tubes 24 finally pass along the roof 23 to the header 16. The portions of tubes 24 disposed in gas pass 6 are suspended from the ceiling by support anchors 25. Finally a third group of tubes 26 originates in the distributing header 20, passes upwardly through gas pass 7, along the roof 23 thereof and thence downwardly to participate in forming coils 22 by running parallel with tubes 21 and 24. Tubes 26, also, are suspended from the roof by anchors 25. All tube coils 22 formed by tubes 21, 24 and 26 are suspended from supports attached to the vertical portions of tubes 26.

The streams of the working air passing through the combustion chamber 1 and the air stream passing through the tube coils 22 unite and mix in the collector 16. From there, tube coils 27, winding back and forth, conduct the working air downwardly in counter-flow relation with respect to the flow of the combustion gases and thus serve as the finishing-off section of the air heater. Tubes 27 are connected to the collector 28, from where the operating air, completely heated to 1100° F. for example, can now be conveyed to the turbine (not shown). The tube coils 27 are suspended from the vertical portions of tubes 24.

The furnace chamber as well as the other flue gas ducts of the air heater are preferably externally lined with an insulated gas tight metallic casing 29, to prevent heat losses and the access of external air to the flue gas ducts or escape of combination gases into the atmosphere. Access or inspection doors as well as closures for the ash hoppers 18 are provided as is customary for steam boilers having a gas tight setting. Also similar observation and clean out doors are provided in gas offtake 5 for the purpose of observing and clearing the passageways between the screen formed by tubes 9.

Figure 5:
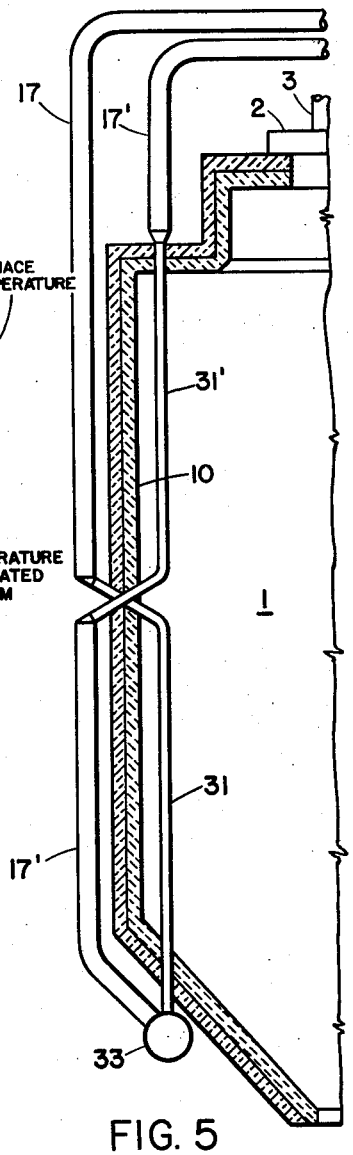
Fig. 5 is a partial section of the furnace chamber of Fig. 1, but on a larger scale and showing another embodiment of the invention.

In the air heater illustrated in Figure 5, the tubes 31 or 31' (corresponding to tubes 9 and 9' of Fig. 1) again originate in one or more common headers 33, which in Fig. 5 are arranged at the lower end of the furnace chamber. Here again tubes 31 and 31' line the furnace in two tube groups being exposed to the path of the flames successively. This arrangement has the advantage that the feed header 33 can be arranged at about the same elevation as the discharge header 28 (see Fig. 1) and below the compressed air heater, resulting in shorter connecting pipes from the heater to the turbine and from the compressor to the heater. In the arrangement of Fig. 5, however, one advantageous feature of the heater design of Fig. 1 must be sacrificed, namely that of introducing all the working medium—when it is at its lowest temperature—to that region of the furnace where the highest gas temperatures prevail.

The invention is not limited to embodiments thereof wherein the radiant heat tubes are disposed parallel to the flame path, as shown in both examples herein above described. Instead, the heater tubes can also be arranged transversely to the flame path, possibly in one group which occupies the left furnace chamber wall and in another group which occupies the right furnace chamber wall.

While there is shown and described herein a preferred embodiment of the invention, it will be understood that changes in construction, combination and arrangement of parts may be made without departing from the spirit and scope of the invention as claimed.

We claim as our invention:

In a tubular gas heater including a furnace chamber having burner means at one end thereof for firing a fuel and air mixture in a direction parallel to the longitudinal axis of said chamber, and having a gas off-take adjacent the other end of said chamber for discharging the combustion gases therefrom, said furnace chamber having a rectangular cross section with portions of the walls thereof being placed more remote from the axial centre of said chamber than other less remote portions, a plurality of tubular conduit means of uniform flow capacity placed at predetermined distances one from the other and disposed within said chamber adjacent the walls thereof, said predetermined distances being substantially larger between tubular conduits adjacent said more remote portions than between tubular conduits adjacent said less remote portions, and gradually increasing from the said smaller distance to the said larger distance.

References Cited in the file of this patent

UNITED STATES PATENTS

| | | |
|---|---|---|
| 464,241 | Condit | Dec. 1, 1891 |
| 1,418,272 | Bell | June 6, 1922 |
| 1,599,613 | Fahrenwald | Sept. 14, 1926 |
| 1,715,643 | De Florez | June 4, 1929 |
| 1,944,318 | Harnsberger | Jan. 23, 1934 |
| 2,079,219 | Lobo | May 4, 1937 |
| 2,367,193 | Blizard | Jan. 16, 1945 |
| 2,394,631 | Neuhart | Feb. 12, 1946 |
| 2,419,463 | Ruegg | Apr. 22, 1947 |
| 2,565,857 | Kleiber | Aug. 28, 1951 |
| 2,617,405 | Keller | Nov. 11, 1952 |

FOREIGN PATENTS

| | | |
|---|---|---|
| 876,624 | Germany | May 15, 1953 |